(12) United States Patent
Zhou et al.

(10) Patent No.: US 7,224,356 B2
(45) Date of Patent: May 29, 2007

(54) STRETCH-DRIVEN MESH PARAMETERIZATION USING SPECTRAL ANALYSIS

(75) Inventors: Kun Zhou, Beijing (CN); John Michael Snyder, Redmond, WA (US); Baining Guo, Beijing (CN); Heung Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 11/003,814

(22) Filed: Dec. 2, 2004

(65) Prior Publication Data

US 2005/0270285 A1  Dec. 8, 2005

Related U.S. Application Data (60) Provisional application No. 60/577,775, filed on Jun. 8, 2004.

(51) Int. Cl.
*G06T 15/00* (2006.01)

(52) U.S. Cl. ............... 345/419; 345/420; 345/423; 345/427

(58) Field of Classification Search ............... None
See application file for complete search history.

(56) References Cited

U.S. PATENT DOCUMENTS

| 6,850,233 B2 * | 2/2005 | Hoppe et al. ............ 345/420 |
| 2004/0217956 A1 * | 11/2004 | Besl et al. ............ 345/419 |
| 2005/0151733 A1 * | 7/2005 | Sander et al. ............ 345/423 |
| 2005/0196026 A1 * | 9/2005 | Klingensmith et al. ...... 382/128 |

OTHER PUBLICATIONS

"On Graph Partitioning, Spectral Analysis, and Digital Mesh Processing" by Craig Gotsman, IEEE Proceedings of the Shape Modeling International, 2003 [0-7695-1909-1/03].*
"Spectral Analysis of PET Projection Data" by Steven R. Meikle et al., 0-783-3534-1/1997 IEEE.*
"Intrinsic Parameterizations of Surface Meshes" by Desbrun M., Meyer M., Alliez P., In Proceedings of Euro-graphics 2002.*
"Normal meshes" by Guskov I., Vidimce K., Sweldens W., Schroder P., In Proceedings of SIGGRAPH 2000, pp. 95-102.*
Brand M., Huang K.: A unifying theorem for spectral embedding and clustering. In *Proceedings of the Ninth International Workshop on Artificial Intelligence and Statistics 2003* (2003), Bishop C. M., Frey B. J., (Eds.).
Bennis C., Vezien J. M., Iglesias G.: Piecewise flattening for non-distorted texture mapping. In *Proceedings of SIGGRAPH 1991* (1991), pp. 237-246.
Campagna S., Seidel H.: Parameterizing meshes with arbitrary topology. In *Proceedings of Image and Multidimensional Digital Signal* (1998), pp. 287-290.
Eck M., Derose T., Duchamp T., Hoppe H., Lounsbery M., Stuetzle w.: Multiresolution analysis of arbitrary meshes. In *Proceedings of SIGGRAPH 1995* (1995), pp. 173-182.
Elad A., Kimmel R.: On bending invariant signatures for surfaces. *IEEE Transaction on PAMI 25,* 10 (2003), 1285-1295.

(Continued)

*Primary Examiner*—Mark Zimmerman
*Assistant Examiner*—Enrique L. Santiago (57) ABSTRACT

A method of performing stretch-driven mesh parameterization. A method of performing stretch-driven mesh parameterization comprising, computing a spectral analysis to parameterize a mesh, and iterating a stretch optimization calculation to further optimize the initial parameterization.

5 Claims, 6 Drawing Sheets
(4 of 6 Drawing Sheet(s) Filed in Color)

ALGORITHM OVERVIEW

OTHER PUBLICATIONS

Floater M.: Parameterization and smooth approximation of surface triangulations. *CAGD 14*, 3 (1997), 231-250.

Gu X., Gortler S., Hoppe H.: Geometry images. In *Proceedings of SIGGRAPH 2002* (2003), pp. 355-361.

Gotsman C., Gu X., Sheffer A.: Fundamentals of spherical parameterization for 3d meshes. In *Proceedings of SIGGRAPH 2003* (2003), pp. 358-363.

Garland M., Heckbert P.: Surface simplification using quadric error metrics. In *Proceedings of SIGGRAPH 1997* (1997), pp. 209-216.

Hormann K., Greiner G.: Mips: An efficient global parameterization method. In *Curve and Surface Design: SaintMalo* (1999), Vanderbilt University Press, pp. 219-226.

Hoppe H.: Progressive mesh. In *Proceedings of SIGGRAPH 1996* (1996). pp. 99-108.

Karni Z., Gotsman C.: Spectral compression of mesh geometry. In *Proceedings of SIGGRAPH 2000* (2000), pp. 279-286.

Krishnamurthy V., Levoy M.: Fitting smooth surfaces to dense polygon meshes. In *Proceedings of SIGGRAPH 1996* (1996), pp. 313-324.

Khodakovsky A., Litke N., Schröder P.: Globally smooth parameterizations with low distortion. In *Proceedings of SIGGRAPH 2003* (2003), pp. 350-357.

Kimmel R., Sethian J.: Computing geodesics on manifolds. In *Proceedings of Nat'l Academy Sciences* (1998), pp. 8431-8435.

Kat Z S., Tal A.: Hierarchical mesh decomposition using fuzzy clustering and cuts. In *Proceedings of SIGGRAPH 2003* (2003), pp. 954-961.

Lévy B., Mallet J.-L.: Non-distortion texture mapping for sheared triangulated meshes. In *Proceedings of SIGGRAPH 1998*(1998), pp. 343-352.

Lévy B., Petitjeans S., Ray N., Mallet J.-L: Least squares conformal maps for automatic texture atlas generation. In *Proceedings of SIGGRAPH 2002*(2002), pp. 362-371.

Lee A., Sweldens W., Schröder P., Cowsar L., Dobkin D.: Maps: multi-resolution adaptive parameterization of surfaces. In *Proceedings of SIGGRAPH 1998*(1998), pp. 95-104.

Maillot J., Yahia H., Verroust A.: Interactive texture mapping. In *Proceedings of SIGGRAPH 1993*(1993), pp. 27-34.

Pedersen H.: Decorating implicit surfaces. In *Proceedings of SIGGRAPH 1995*(1995), pp. 291-300.

Sorkine G., Cohen-Or D., Goldenthal R., Lischinski D.: Bounded-distoration piecewise mesh parameterization. In *Proceedings of IEEE Visualization 2002*(2002), pp. 355-362.

Sander P., Gortler S., Snyder J., Hoppe H.: Signal-specialized parameterization. In *Proceedings of Eurographics Workshop on Rendering 2002*(2002).

Sheffer A., Hart J.: Seamster: inconspicuous low-distortion texture seam layout. In *Proceedings of IEEE Visualization 2002*(2002), pp. 291-298.

Sander P., Snyder J., Gortler S., Hoppe H.: Texture mapping progressive meshes. In *Proceedings of SIGGRAPH 2001* (2001), pp. 409-416.

Silva V., Tenenbaum J.: Global versus local methods in nonlinear dimensionality reduction. In *Advances in Neural Information Processing Systems* (2002), pp. 705-712.

Sander P., Wood Z., Gortler S., Snyder J., Hoppe H.: Multi-chart geometry images. In *Symposium on Geometry Processing 2003* (2003), pp. 146-155.

Taubin G.: A signal processing approach to fair surface design. In *Proceedings of SIGGRAPH 1995*(1995), pp. 351-358.

Tenenbaum J., Silva V., Langford J.: A global geometric framework for nonlinear dimensionality reduction. *Science 290*(2000), 2319-2323.

http://weblinks3.epnet.com/ citation.asp?tb=0&_ug= sid+1F41C6 AC%2D5E20%2D421E%2 D8745%2D00A DEID642F6%40 sessionmgr2+C682&_ us=sm+KS+or+Date+A4A8 &_uso+st%5B0+%2DAN++4026293 +tg%5B0+%2D+db%5B0+ %2Dbch+op%580+%2D+hd+False+6D64&cf=1&fn=1&rn=1&.

Zigelman G., Kimmel R., Kiryati N.: Texture mapping using surface flattening via multidimensional scaling. *IEEE Transactions on Visualization and Computer Graphics 8*, 2 (2002), 198-207.

\* cited by examiner

FIG. 1

ALGORITHM OVERVIEW

FIG. 2

FIG. 3 a) Angular distance only
$L^2 = 1.02, L^\infty = 2.05$
401

(b) GDD only
$L^2 = 1.01, L^\infty = 1.87$
402

(c) Combined
$L^2 = 1.01, L^\infty = 1.94$
403

STRETCH-DRIVEN MESH PARAMETERIZATION USING SPECTRAL ANALYSIS

CROSS-REFERENCE TO RELATED APPLICATION

This application claims the benefit of U.S. Provisional Patent Application No. 60/577,775 filed Jun. 8, 2004, the contents of which are hereby incorporated by reference.

BACKGROUND

The present application relates to the generation of computer graphics. In particular it relates to rendering a three dimensional object realistically in two dimensions.

Computer graphic techniques for mapping textures to three-dimensional surfaces have been developed and implemented in software and hardware. These conventional implementations usually map rectangular texture samples, defined by a mesh structure, to the surface being rendered. Such texture samples or maps tend to present certain limitations that may be reflected in the quality of the rendered image from these maps.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide a way of rendering three dimensional objects in two dimensions. One or more grids are typically disposed on an object to map its contours. The surface of an object may be broken up into a number of subsurfaces (that each have their own grids), that may be chosen to lessen stretch distortion due to variation in surface heights.

The present examples provide a fully automatic method, called iso-charts, that can create texture atlases on arbitrary meshes. It considers stretch not only when parameterizing charts (such as measuring distortion), but also when forming charts. An output atlas may bound the stretch by a user specified constant, allowing the user to balance the number of charts against their stretch.

Many of the attendant features of this invention will be more readily appreciated as the same becomes better understood by reference to the following detailed description considered in connection with the accompanying drawings.

DESCRIPTION OF THE DRAWINGS

The patent or application file contains at least one drawing executed in color. Copies of this patent or patent application publication with color drawings will be provided by the Office on request and payment of the necessary fee. These and other features and advantages of the present invention will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present invention may be constructed or utilized. The description sets forth the functions of the invention and the sequence of steps for constructing and operating the invention in connection with the examples illustrated. Those skilled in the art will appreciate that the sequence of acts or steps illustrated is exemplary, and that the order may be varied to achieve the same result. Also, the same or equivalent functions and sequences may be accomplished by different examples of the invention.

Although the present examples are described and illustrated herein as being implemented in a two dimensional computer graphics system, the system described is provided as an example and not a limitation. As those skilled in the art will appreciate, the present invention is suitable for application in a variety of different types of image generation systems, including three dimensional models generated from computer graphics and the like.

INTRODUCTION

The example provided includes a method for parameterizing arbitrary meshes ("mesh paramaterization") using multiple charts. Decomposition into charts and parameterizing each chart may be automatic and based on the concepts of spectral analysis on a matrix of geodesic distances between vertices and the parameterization stretch.

Mesh parameterization may be utilized in the rendition of three dimensional graphics. Many signals may be used in rendering three dimensional graphics, including normals, colors, or shading parameters, and can be associated with three dimensional surfaces in an effort to produce more realistic images. In particular "texture maps" may be used to describe a surface's texture, so that a more realistic image is reproduced.

The example described below provides an automatic method that generates texture maps which tend to provide fidelity using minimum texture samples. The example provided may also be applied to texture synthesis, geometry compression, remeshing and many other geometric processes.

This type of breakdown may tend to minimize the stretch depending upon how the map areas are selected. Thus, in modeling an image for computer graphic rendition a single unfolding of an arbitrary mesh onto a texture image may create regions of high distortion in a reproduced image. So, generally a mesh is partitioned into a set of charts. The set of charts make up a texture atlas. Each chart is assigned a set of parameters by a region of a texture domain, and these parameterizations collectively form an atlas.

A fully automatic method, called iso-charts, may create texture atlases on arbitrary meshes. It considers stretch not only when parameterizing charts (such as measuring distortion), but also when forming charts. An output atlas may bound stretch by a user specified constant, allowing the user to balance the number of charts against their stretch.

The approach of stretch driven mesh parameterization using spectral analysis combines two techniques: 1) stretch-minimizing parameterization, based on the surface integral of the trace of the local metric tensor, and 2) the "isomap" or MDS ("multi-dimensional scaling") parameterization, based on an eigen-analysis of the matrix of squared geodesic distances between pairs of mesh vertices. Typically only a few iterations of nonlinear stretch optimization need be applied to the MDS parameterization to obtain low-stretch atlases. The close relationship found between these two parameterizations allows application of spectral clustering based on MDS to partition the mesh into charts having low stretch. A graph cut algorithm is applied to optimize chart boundaries and further minimize stretch, follow sharp features, and avoid meandering.

The method of stretch driven mesh parameterization using spectral analysis tends to create texture atlases quickly, with fewer charts and lower stretch useful in applications like geometric re-meshing. Another example describes an extension, signal-specialized atlas creation, that tends to promote efficient sampling of surface signals, and tends to produce better texture maps by considering signal stretch in chart formation.

Parameterization may be used in many geometry processing algorithms, such as texture mapping, morphing, editing, remeshing and compression. To parameterize an arbitrary mesh, a texture atlas may be built. A target surface that is to be modeled is typically first partitioned into a set of charts, called chartification, which are parameterized and packed into a texture domain.

In particular creating a texture atlas may include considerations of how much a distance is shrunk or "stretched" when a mesh is applied to a surface in an attempt to produce a more realistic image.

Distortion in a final image recreated from the texture atlas may be corrected or minimized in various ways. One way involves the proper selection of the charts in a texture atlas. In another the number of charts in an atlas may be varied. Thus, the way that a targeted surface is partitioned into charts has an effect on the appearance of the three dimensional object being rendered in two dimensions.

Because a 3D surface is not isometric to a 2D plane, parameterization causes distortion. Distortion can be measured in many ways, including how well angles or areas are preserved, or how much parametric distances are stretched or shrunk onto the surface. Stretch driven mesh parameterization using spectral analysis focuses on distance distortion, specifically a definition of geometric stretch, which measures the average and worst-case stretching of local distances over the surface.

Minimizing stretch typically utilizes nonlinear optimization. Stretch minimization tends to be slow, and it tends to disregard stretch when forming charts in favor of unrelated heuristics that cut across sharp features or cluster based on chart compactness and planarity. The latter is true because if computing a stretch-minimizing embedding for a chart is costly, then computing it over all possible chart partitionings tends to be completely impractical.

In an attempt to improve this, a form of nonlinear dimensionality reduction called IsoMap is applied. IsoMap tends to minimize geodesic distance distortion between pairs of vertices on the mesh. The key to this application is the observation that geodesic distance distortion is closely related to stretch, though they are defined quite differently. IsoMap thus tends to provide two features in atlas generation. It provides an effective way, called spectral analysis, to decompose the model into large, geometrically meaningful parts like animal appendages that can be parameterized with little stretch. Without extra computation, it also supplies an initial parameterization for each part. In fact, it typically provides a good starting point for stretch minimization, so that a few iterations of nonlinear stretch optimization may quickly converge and remove problem "foldovers" easily.

A feature in stretch driven mesh parameterization using spectral analysis is a stretch-driven chartification method which clusters based on a spectral analysis of the matrix of geodesic distances. It can allow a user to bound stretch while typically keeping the number of charts small. Such spectral analysis simultaneously obtains a low-stretch parameterization of charts quickly. A graph cut may be used to optimize chart boundaries, and modify the capacity metric to consider geodesic distance distortion and therefore stretch, given the relationship discovered between the two metrics. Stretch driven mesh parameterization using spectral analysis utilizes "special spectral clustering" to create typically better charts in cases when geometric parts have periodic (tubular) structure. Finally, the approach has been generalized to signal-specialized atlas creation. Stretch driven mesh parameterization using spectral analysis atlases may be the first whose chart partitioning, as well as parameterization, is adapted to a particular signal such as a normal or color map.

Process Overview

Figure 1:
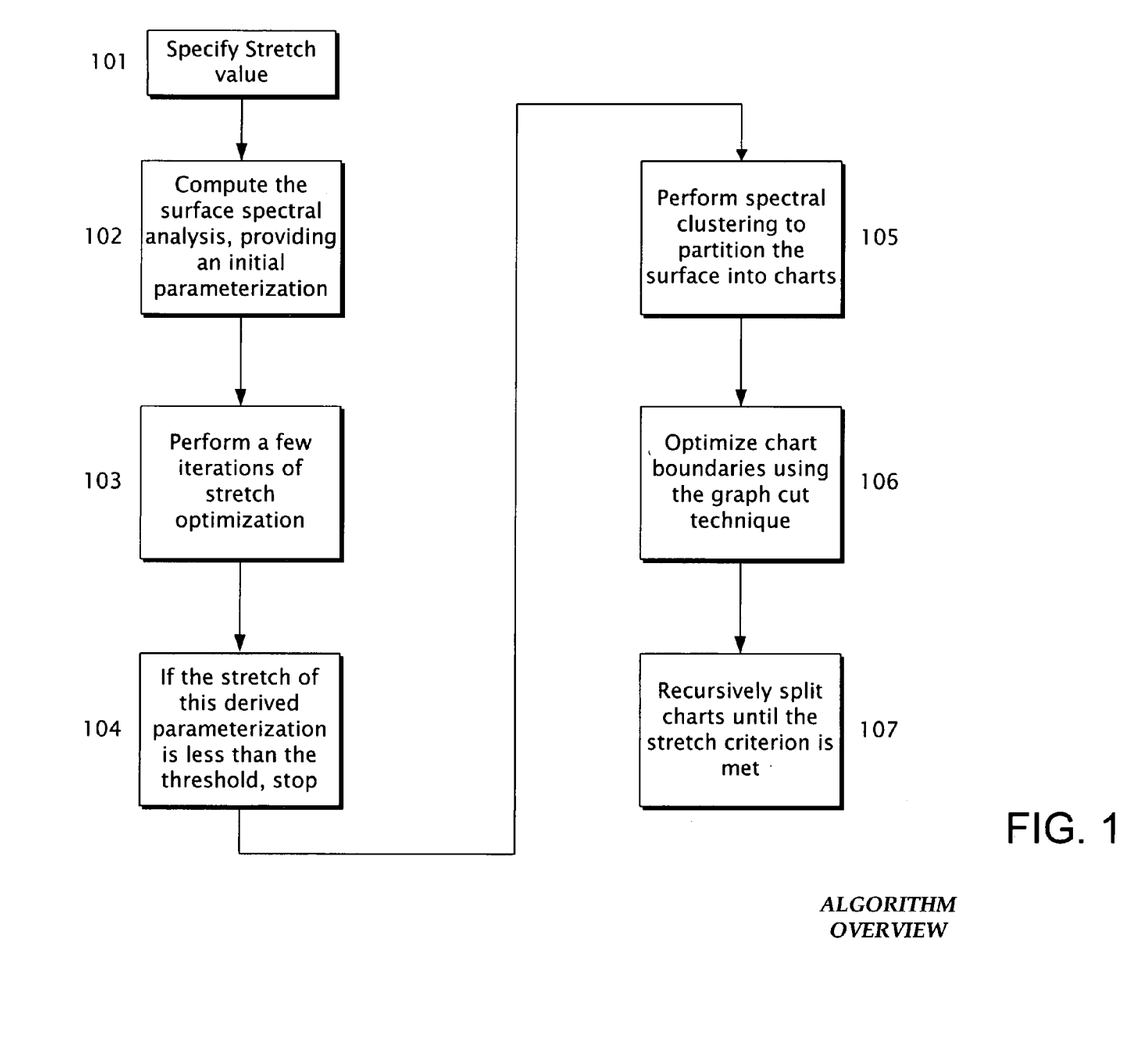
FIG. 1 is a block diagram showing stretch driven mesh parameterization using spectral analysis.

FIG. 1 is a block diagram showing stretch driven mesh parameterization using spectral analysis. The approach to stretch driven mesh parameterization using spectral analysis may be thought of as a top-down, stretch-driven method. Given a surface and a user-specified stretch value at block 101, the following are performed: at block 102 the surface spectral analysis is computed, providing an initial parameterization. Block 102 is described in further detail below in the section titled "Surface Spectral Analysis". At block 103 a few iterations of a conventional stretch optimization are performed. At block 104 if the stretch of this derived parameterization is less than the threshold, the process stops. At block 105 spectral clustering to partition the surface into charts is performed. At block 106 the optimization of chart boundaries using the graph cut technique is performed. At block 106 the charts are recursively split until the stretch criterion is met.

The result of the process is a set of charts whose parameterizations have bounded stretch. Chart topology need not be explicitly checked; the stretch-driven process ensures that all charts are eventually subdivided into topological disks since otherwise parameterization stretch is infinite. A check is made to see that the parameterization domain does not overlap itself and subdivide in that typically rare case. As a post-processing step, small charts are merged together if the parameterization stretch of the merged chart is less than the user specified stretch value.

Distortion is bounded using two norms on geometric or signal stretch. The L2 norm integrates $(\gamma^2_{max}+\gamma^2_{min})/2$ over the surface, followed by an over-all square root. The L∞ norm maximizes max $\{\gamma_{max}, 1/\gamma_{min}\}$ over the entire surface.

Here, $\gamma_{max}$ and $\gamma_{min}$ are scalar functions over the surface representing the largest and smallest singular values of the Jacobian of the affine mapping from texture space to model or signal space at any point. The inclusion of shrink, $1/\gamma_{min}$, in the L∞ norm is a modification which penalizes under-sampling. The bounding of distortion using two norms on geometric or signal stretch is described in "System and Method for Providing Signal-Specialized Paramaterization", U.S. patent application Ser. No. 10/138,289, filed May 1, 2002, the contents of which are incorporated herein by reference.

Figure 2:
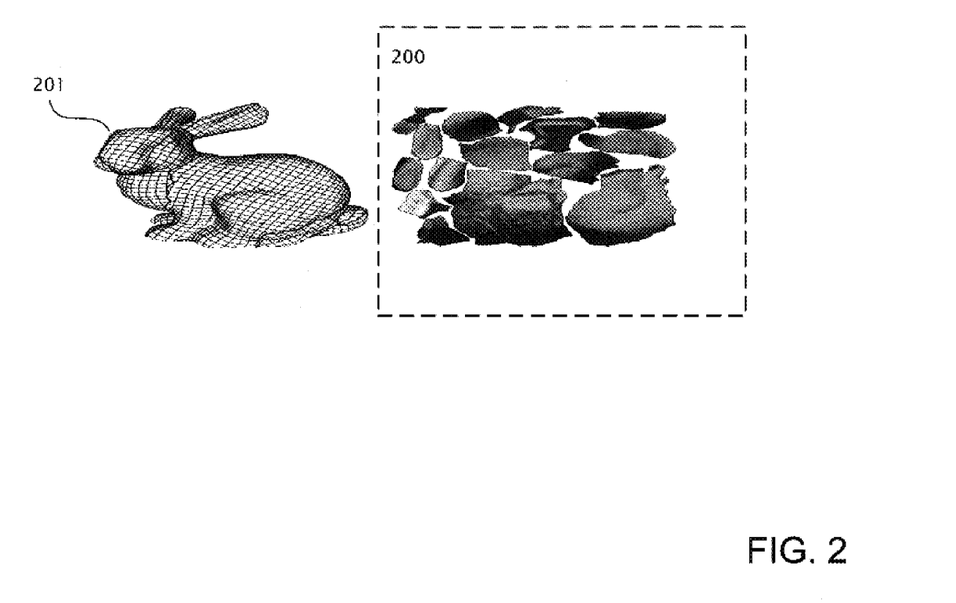
FIG. 2 shows the chartification and parameterization results for a bunny model.

FIG. 2 shows the chartification and parameterization results for a bunny model. An Iso-chart atlas 200 created for the bunny model 201 is shown. As can be seen the surface of the bunny has been partitioned into 15 large charts, which can be flattened with typically lower stretch than previous methods (L2=1.01, L∞=2.26). As can be seen parts of the model like its head, ears, and body are decomposed into large charts. In the example shown the computation took about 1 minute.

Chartification and Parameterization

Chartification and Parameterization includes application of surface spectral analysis, reduction of stretch with spectral analysis, surface spectral clustering, computing optimal parameter boundaries, medial region embedding, spectral clustering for tubular shapes, implementation, and signal specialized atlas creation.

Surface Spectral Analysis

This process builds upon the conventional dimensionality reduction method IsoMap (isometric feature mapping). Given a set of high-dimensional points, IsoMap computes the geodesic distances along a manifold as sequences of hops between neighboring points. It then applies MDS (multidimensional scaling) to these geodesic distances to find a set of points embedded in low-dimensional space with similar pairwise distances.

This application of IsoMap is termed "surface spectral analysis" and outline its computation is described as follows. Given a surface with N vertices, $x_i$, where each $x_i$ is a position in 3D space compute the symmetric matrix $D_N$ of squared geodesic distances between surface vertices.

Next apply double centering and normalization to $D_N$ to yield $B_N = -(1/2) J_N D_N J_N$, where $J_N$ is a N×N centering matrix defined by $J_N = I - (1/N) 1 1^T$, I is the identity matrix, and 1 is a vector of ones of length N. This constrains the center of gravity of the computed point set to lie at the origin.

Compute the eigenvalues. $\lambda_i$ and their corresponding eigenvectors $v_i$ of $B_N$, (i=1, 2, . . . , N).

For each vertex i of the original surface, its embedding in the new space is an N-dimensional vector $y_i$ whose j-th component is given by $\vec{y}_i^j = \sqrt{\lambda_j} \vec{v}_j^i$ (j=1,2, . . . ,N).

The eigenvalues $\lambda_i$ and their corresponding eigenvectors $\vec{v}_i$ of $B_N$, (i=1, 2, . . . , N) form the spectral decomposition of the surface shape. The vectors $y_i$ represent the warped model, and are in one-to-one correspondence with the original vertices $x_i$. Eigenvectors corresponding to large eigenvalues represent global, low-frequency features on the surface while eigenvectors corresponding to small eigenvalues represent high-frequency details. It is natural to consider the high-energy, low-frequency components as a basis of chartification and parameterization.

Although N eigenvalues are needed to fully represent a surface with N vertices, a small number of them typically dominate the energy. For the bunny model shown in FIG. 2, the top 5 eigenvalues constitute over 85% of the squared energy; in other words, $$\left( \sum_{i=1}^{5} \lambda_i \bigg/ \sum_{i=1}^{N} \lambda_i \right) > 85\%.$$

Therefore only the n<<N largest eigenvalues and corresponding eigenvectors are calculated, leading to an n-dimensional embedding for all vertices.

The distortion of this n-dimensional embedding can be calculated as the sum of the geodesic distance distortion over all vertices. For each vertex i, its geodesic distance distortion ("GDD") under the embedding is defined as:

$$GDD(i) = \sqrt{\frac{1}{N-1} \sum_{j=1}^{N} (\|\vec{y}_i - \vec{y}_j\| - d_{geo}(i, j))^2} \quad (1)$$

where $\vec{y}_i$ is the n-dimensional embedding coordinate of vertex i, and $d_{geo}(i,j)$ is the geodesic distance between vertex i and j. This definition can be extended from a vertex to a triangle by averaging the distortions of its three vertices, and is used in the later section entitled "Computing Optimal Partition Boundaries".

When n=2, surface spectral analysis yields a surface parameterization minimizing the sum of squared GDD over all vertices. Thus it is noted that surface spectral analysis, can be simultaneously applied to two problems: decomposition for chartification, and parameterization.

To calculate the geodesic distances between surface points of polygonal models, a conventional fast matching method, which runs at $O(N^2 \lg N)$ and obtains typically more precise results than the Dijkstra graph search method, since it allows paths that cut across mesh triangles is used.

Spectral Analysis and Stretch

GDD-minimizing and stretch-minimizing parameterizations both focus on distance distortion. Still, GDD differs from stretch in several ways. It is global rather than local, since it considers distance between vertices that are arbitrarily far on the surface, rather than local stretch induced by the Jacobian at a point. It is difference-based rather than ratio-based since it penalizes differences between the original and parametric distances rather than how much unit-length tangent vectors are stretched. And it is discrete rather than continuous since it only considers distance distortions between vertex pairs rather than stretch in every triangle and in every direction.

The discrete nature of spectral analysis, which measures distance distortion only between vertex pairs, gives rise to a problem with triangle flips. Our process for calculating spectral analysis and stretch provides a simple solution. Since triangle flips are defined to cause infinite stretch, and our algorithm typically splits charts whose stretch is above the user's threshold, any finite threshold guarantees the final atlas will not contain flips.

Spectral analysis typically requires solution of a low-dimensional eigenvalue problem rather than general nonlinear optimization. The computation can be accelerated further using the "landmark" extension described below.

Despite differences between stretch and GDD, spectral analysis typically reduces stretch effectively.

Surface Spectral Clustering

If the parameterization induced by spectral analysis fails to satisfy the user's stretch threshold, it is partitioned into several smaller charts. Recalling that global features of a model such as the head, ears, legs, and tails of animals correspond to the larger eigenvalues, they are used to partition. A few representative vertices using the spectral analysis results are computed. Then charts are grown simultaneously around these representatives, with a method termed "surface spectral clustering". The process is as follows:

1. Rank the eigenvalues $\lambda_i$ and corresponding eigenvectors $\vec{v}_i$ from surface spectral analysis such that ($\lambda_1 \geq \lambda_2 \geq \ldots \geq \lambda_N$).
2. Get the top n eigenvalues and eigenvectors such that $\lambda_n/\lambda_{n+1}$ is maximized.
3. For each vertex i of the mesh, compute its n-dimensional embedding coordinates:

$$\vec{y_i} = \sqrt{\lambda_j}\vec{v_j}(j = 1, 2, \ldots, n).$$

4. For each of the n embedding coordinates, find the two vertices with maximum and minimum coordinate values and set them as 2n representatives.
5. Remove representatives which are too close together, yielding m≤2n representatives.
6. Partition the mesh into m parts by growing charts simultaneously around the representatives using the geodesic distance calculated in surface spectral analysis.

Step 2 amounts to a relative error threshold that finds the "knee" in the curve relating energy to the number of eigenvalues. The value of n is a measure of shape complexity: n<3 implies a fairly flat shape; large n implies a complicated shape with significant detail. Eliminating the remaining N−n eigenvalues ignores high frequency detail and avoids partitioning into too many charts. The present implementation also restricts n≤10 (see the section titled "Implementation Details"), which in turn restricts the maximum number of sub-charts.

Since representatives computed from different dimensions in Step 4 may be close and so redundant, Step 5 removes them. A distance threshold of 10 times the average edge length of the input mesh is used. In Step 6, the geodesic distance from a triangle to a representative vertex is computed as the average of the geodesic distances of the triangle's three vertices to the representative.

Computing Optimal Partition Boundaries

After splitting charts, the boundaries between them are optimized. Chart boundaries should satisfy two objectives: 1) they should cut through areas of high curvature without being too jaggy, and 2) they should minimize the embedding distortions of the charts they border.

The first objective has been addressed by conventional methods, which minimize various measures of chart compactness while choosing chart cuts of shortest length or along edges having high dihedral angle. A conventional graph cut method is used to decompose meshes, an idea applied to mesh parameterization. The second objective relates to having a stretch-minimizing partition.

The second objective may be solved by formulating the optimal boundary problem as a graph cutting problem. For simplicity, the binary case which splits the surface into two is presented. When subdividing into more than two charts, we consider each pair of neighboring charts in turn.

Figure 3:
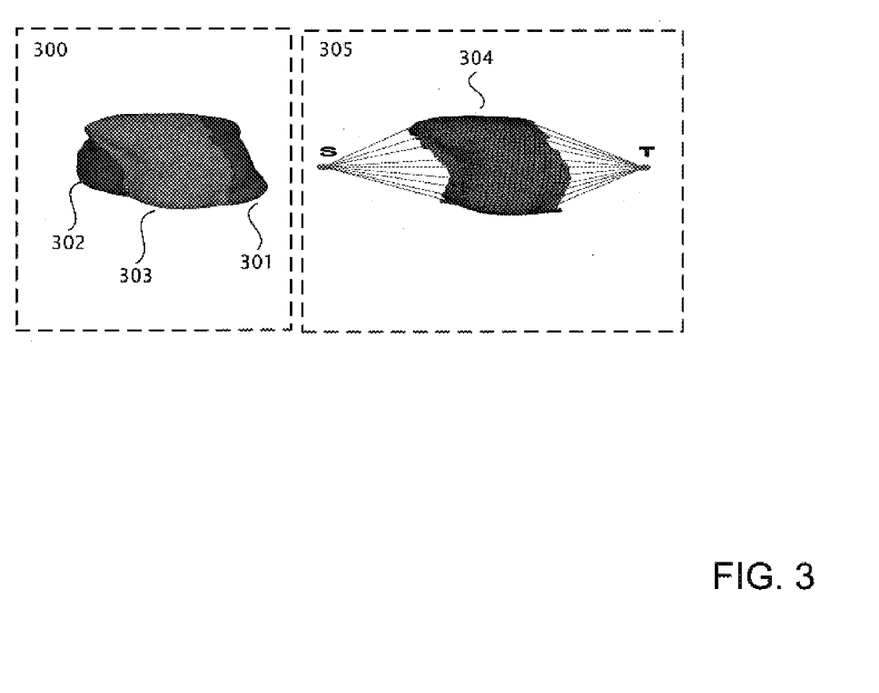
FIG. 3: illustrates finding the optimal partition boundary as a graph cut problem.

FIG. 3: illustrates finding the optimal partition boundary as a graph cut problem. In finding the boundary: 300 the shape is decomposed into three parts, lateral areas 301 (red), 302 (blue) and medial area 303 (green). A graph 304 is constructed for the medial area 303. An optimal boundary between two charts 302 and 301 is sought. The initial partition is generated by using surface spectral clustering. Then a medial region, 303 is generated, by expanding an area to either side of the initial split boundary. The medial region's size is proportional to the total area of the unsplit patch; 30% is used for all examples. Now an undirected flow network graph 305 can be constructed from 303 using an extension of the conventional method of hierarchal mesh decomposition using fuzzy clustering and cuts. In this method the definition of "capacity" between the two adjacent triangles of the mesh $f_i$ and $f_j$ is defined as $$c(f_i, f_j) = \alpha c_{ang}(f_i, f_j) + (1-\alpha)c_{distort}(f_i, f_j) \qquad (2)$$

The first term in equation (2) corresponds to the first objective of a nonjaggy cut through edges of high dihedral angle. This is accomplished with:

$$c_{ang}(f_i, f_j) = \left(1 + \frac{d_{ang}(f_i, f_j)}{avg(d_{ang})}\right)^{-1} \qquad (3)$$

where $d_{ang}(f_i, f_j)$ is defined as $(1-\cos \alpha_{ij})$, $\alpha_{ij}$ is the angle between normals of the triangles $f_i$ and $f_j$, and $avg(d_{ang})$ is the average angular distance between adjacent triangles.

The second term in equation (2) measures embedding distortion, defined as $$c_{distort}(f_i, f_j) = \frac{d_{distort}(f_i, f_j)}{avg(d_{distort})} \qquad (4)$$

$$d_{distort}(f_i, f_j) = |GDD_A(f_i) - GDD_B(f_i)| + \qquad (5)$$
$$|GDD_A(f_j) - GDD_B(f_j)|$$

where $GDD_A(f_i)$ and $GDD_B(f_i)$ are the GDDs of triangle $f_i$ under the embedding induced by 302 or 301, respectively. $avg(d_{distort})$ is the average $d_{distort}(f_i, f_j)$ over all pairs of adjacent triangles. This definition of $c_{distort}(f_i, f_j)$ prefers boundary edges whose adjacent triangles balance GDD between embeddings determined by 302 and 301. In other words, the cut should avoid placing a triangle on the wrong side where it creates unnecessary distortion.

Figure 4:
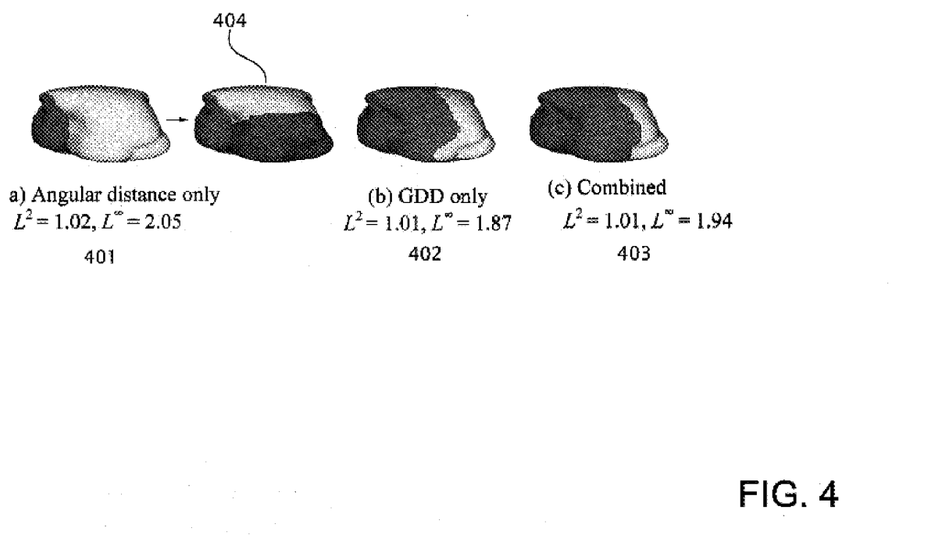
FIG. 4: Illustrates a comparison of different graph-cut capacities.

FIG. 4: Illustrates a comparison of different graph-cut capacities. The weight parameter α trades off the two objectives. Setting α=1 may achieve good results for models with sharp features. For shapes whose dihedral angles vary smoothly in the medial area, it tends toward a cut of shortest length 401. But this split produces too much stretch in the right chart, which must be split again to satisfy the user's threshold 404.

On the other hand, setting α=0 minimizes GDD 402, which avoids chart proliferation but makes the boundary jaggier. A combination is shown with α=0.5, 403. Although the parameterization stretch is a little larger than 402, a smoother boundary may be desirable in many applications.

Landmark IsoMap for Medial Region Embedding

Returning to FIG. 4, to compute an optimal partition, two embeddings over the unsplit chart may be needed: one corresponding to side A 302 and one to side B 301. These two embeddings define $GDD_A$ and $GDD_B$. Neither sub-chart "core", A or B, contains the inner vertices of the medial region C 303. So the embedding coordinates of C's vertices using spectral analysis on A or B alone may not be computed. Since it is not yet known which triangles of C will be joined with A and which with B, embeddings for each sub chart that are unduly distorted by triangles that end up inserted in the other sub-chart should be avoided. An extension of IsoMap, called landmark IsoMap, embeds the medial region implicitly given only embeddings for each core and the geodesic distance relationship of C's to each core's vertices.

Suppose there are $N_A$ vertices in A. After performing surface spectral analysis, there are $n_A$ eigenvalues $\lambda_i$ and corresponding eigenvectors $\vec{v}_i$. The $n_A$-dimensional embeddings of all vertices in A form the columns of an $n_A \times N_A$ matrix $L_A$:

$$L_A = \left[ \sqrt{\lambda_1}\, \vec{v}_1,\ \sqrt{\lambda_2}\, \vec{v}_2,\ \ldots,\ \sqrt{\lambda_{n_A}}\, \vec{v}_{n_A} \right]^T$$

A vertex p outside A can be located in its $n_A$-dimensional embedding space by using its known geodesic distances to the vertices in A as constraints. This same idea identifies geographic location using a finite number of distance readings in GPS. Let $\Delta_p$ denote the column vector of squared distances between p and the vertices in A. The $n_A$-dimensional embedding coordinate $\vec{v}_p$ can be computed by the formula:

$$\vec{v}_p = \frac{1}{2} L_A^\dagger (\bar{\Delta} - \Delta_p)$$

where $\bar{\Delta}$ is the column mean of $D_{N_A}$, and $L^\dagger_A$ is the pseudoinverse transpose pf $L_A$:

$$L_A^\dagger = \left[ \frac{\vec{v}_1}{\sqrt{\lambda_1}},\ \frac{\vec{v}_2}{\sqrt{\lambda_2}},\ \ldots,\ \frac{\vec{v}_{n_A}}{\sqrt{\lambda_{n_A}}} \right]^T$$

Now GDDs for all vertices in C under the embedding induced by A may be calculated, and similarly for B.

Special Spectral Clustering for Tubular Shapes

Figure 5:
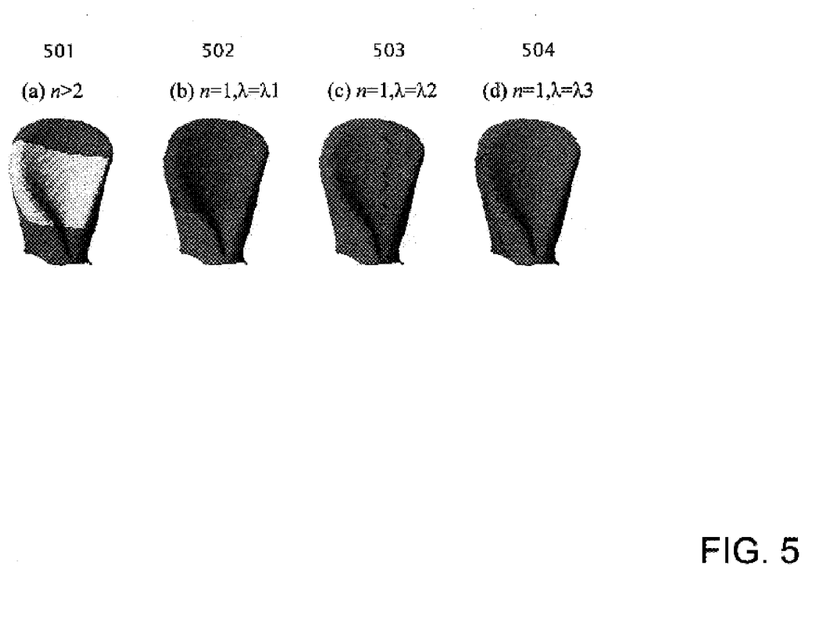
FIG. 5 illustrates the partitioning of tubular shapes for the example of a bunny ear shape having spectral clustering partitioning into five charts.

FIG. 5 illustrates a bunny ear shape having spectral clustering partitioning into five charts. In particular the figure illustrates the partitioning of tubular shapes. Column a 501 shows general spectral clustering (as described in the section entitled "Surface Spectral Clustering"), while columns b–d 502, 503, 504 show binary clustering based on the first, second, and third eigenvalues. Given the n dominant eigenvalues, surface spectral clustering partitions the shape into at most 2n charts. This works well for complex shapes but can produce too many charts for simple shapes with $n \leq 3$. As shown 501, spectral clustering partitions the bunny ear into 5 charts. To avoid excessive partitioning, we can instead subdivide the chart into two, according to the first of the embedding coordinates. This approach often works, but it is not ideal for tubular/cylindrical protrusions, a common feature in typical meshes.

Another method 504 observes that dominant eigenpairs of the distance matrix can be used to detect and segment data points with cyclic distributions. The following heuristic has proven effective, which regards a shape as tubular if its eigenvalues $\lambda_i$ meet the following conditions:

$$\left( \frac{\sum_{i=1}^{3} \lambda_i}{\sum_{i=1}^{n} \lambda_i} \right) > 0.9,$$

i.e. the top three eigenvalues represent the shape well.
$\lambda_1/\lambda_2 > 3$, means the shape is long enough.
$\lambda_2/\lambda_3 < 2$, means the shape is cyclic.
$\lambda_3/\lambda_4 > 3$, i.e. the 4-th eigenvalue decreases quickly enough to be ignored.

As long as a shape is detected as a cylinder/tube, it may be partitioned into two sub-charts. The second and third dimensions can be regarded as cyclic axes. Partitioning the shape according to the third principal dimension, which corresponds to the shorter cyclic axis, produces more planar patches. As shown 504 the results using the third component, provides a more natural split than using the first or second component 502, 503.

The overall chart subdivision process may be summarized as follows. If the top three eigenvalues contain less than 90% of the energy, we perform "general" spectral clustering (as previously described in the section entitled "Surface Spectral Clustering"). Otherwise, if the chart is tubular, a "special" spectral clustering described in this section is performed. In all other cases, binary spectral clustering is performed, using the single embedding coordinate corresponding to the largest eigenvalue. Typically, only a single nonbinary chart subdivision is performed (at the first iteration); thereafter, binary subdivision suffices.

Implementation Details

A naive implementation of stretch-driven chartification and parameterization algorithm is expensive, especially as the number of model vertices grows. To accelerate the computation, the Landmark IsoMap process is utilized as described in the last section, to compute the embedding coordinates for vertices in the medial region. Landmark IsoMap selects q vertices as landmark points, where q<<N. Instead of computing the N×N matrix of squared geodesic distances, $D_N$, an q×N matrix $D_{q,N}$ is computed measuring distances from each vertex to the landmark points only. Embedding coordinates of the q landmark points are computed using surface spectral analysis while the remaining vertices can be computed using the method described in the section entitled "Landmark IsoMap for Medial Region Embedding".

To get the landmark points, models may be simplified by performing half edge collapse operations based on the quadric error metric. Progressive meshes may free the user from having to simplify each chart from scratch. Enough vertex splits are performed and recorded in the PM to obtain enough landmark points within the chart.

For all charts, we use q=100 landmark points, which makes the processing fast even on large charts. When the chart has fewer than 100 vertices, simply include them all as landmark points. Though the landmark embedding can exhibit more stretch than the full analysis, this is likely only for large chart that have high stretch and will need to be refined anyway. Landmark embedding with q independent of chart size thus provides a fast but typically reasonable heuristic.

Since the top 10 eigenvalues typically constitute over 95% of the squared energy in the test models, another method to speed up the process is to calculate only the first 10 eigenpairs in surface spectral analysis. In summary, the geodesic distance computation is reduced to O(qN log N) and spectral decomposition to $O(q^2)$.

Signal-Specialized Atlas Creation

So far, geometric stretch has been used to drive chartification and parameterization. Iso-Charts for stretch-driven mesh parameterization using spectral analysis can also be generalized to produce a signal-specialized parameterization which represents a given surface signal using textures as compact as possible.

Iso-Charts for stretch-driven mesh parameterization using spectral analysis may be extended to surface signals by computing the pairwise signal distances between vertices. Given two vertices i and j and the geodesic path between them, the signal distance between them is defined as the sum of signal differences between pairs of adjacent points along the path. Applying spectral analysis to a matrix of signal distances creates a parameterization that preserves them, and therefore ties Iso-Charts for stretch-driven mesh parameterization using spectral analysis to signal distortion in the same way as the process was previously described as applying to geometric distortion.

Typical signals such as textured colors may exhibit much more variation than the underlying geometry. Surface spectral analysis using signal distances typically produces a complex embedding with many dominant eigenvalues which may lead to excessive partitioning. This leads to the combination of geometric and signal stretch as described in "System and Method for Optimizing Geometric Stretch of a Parametrization Scheme", U.S. patent application Ser. No. 10/138,751, filed May 1, 2002, the contents of which are incorporated herein by reference. The solution achieved here defines distance with a similar combination of geodesic and signal distances:

$$d_{comb}(i, j) = \beta \frac{d_{geo}(i, j)}{avg(d_{geo})} + (1 - \beta) \frac{d_{sig}(i, j)}{avg(d_{sig})} \quad (5)$$

where $d_{sig}(i, j)$ is the signal distance between i and j. Good results are typically achieved with $\beta=0.5$.

Figure 6:
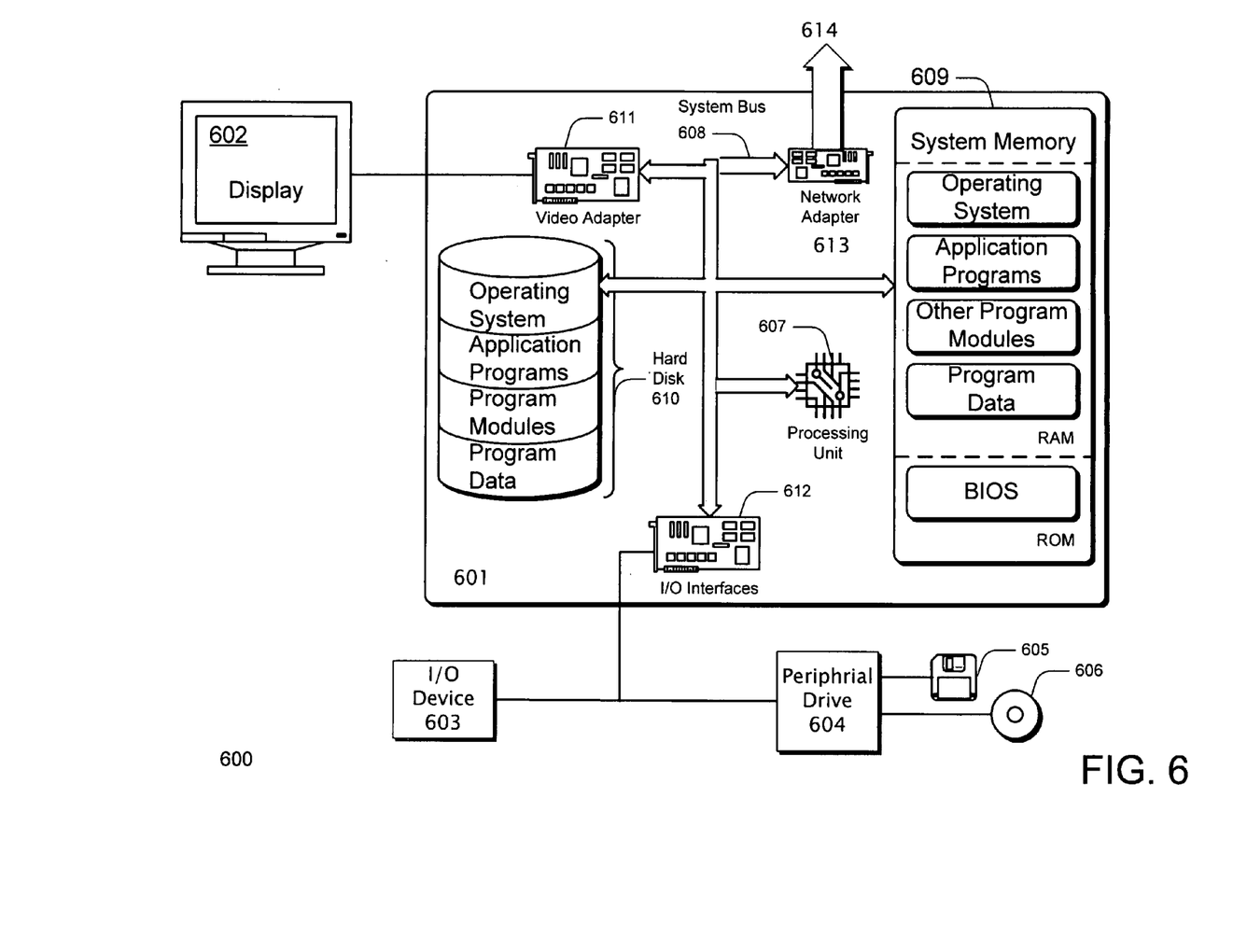
FIG. 6 illustrates an exemplary computing environment 600 in which the systems and methods described in this application, may be implemented.

FIG. 6 illustrates an exemplary computing environment 600 in which the systems and methods described in this application, may be implemented. Exemplary computing environment 600 is only one example of a computing system and is not intended to limit the examples described in this application to this particular computing environment.

The computing environment 600 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 600 includes a general-purpose computing system in the form of a computing device 601. The components of computing device 601 can include one or more processors (including CPUs, GPUs, microprocessors and the like) 607, a system memory 609, and a system bus 608 that couples the various system components. Processor 607 processes various computer executable instructions to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607.

Mass storage devices 604 may be coupled to the computing device 601 or incorporated into the computing device by coupling to the buss. Such mass storage devices 604 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like 606. Computer readable media 605, 606 typically embody computer readable instructions, data structures, program modules and the like supplied on floppy disks, CDs, portable memory sticks and the like. The Iso-Chart process may reside on one or more computer readable media, as well as in the system memory 609, or its equivalent.

Any number of program modules can be stored on the hard disk 610, Mass storage device 604, ROM and/or RAM 609, including by way of example, an operating system, one or more application programs, other program modules, and program data. Each of such operating system, application programs, other program modules and program data (or some combination thereof) may include an embodiment of the systems and methods described herein.

A display device 602 can be connected to the system bus 608 via an interface, such as a video adapter 611. A user can interface with computing device 702 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 600 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

As can be seen in the example above spectral analysis on the matrix of geodesic distances between points on a surface tends to provide a fast, simple, and effective way to simultaneously solve two problems in atlas generation: partitioning the model into charts, and parameterizing those charts. The method may also be simply generalized to account for signal rather than geometric distance, to optimize the atlas for a particular signal. As shown spectral analysis tends to reduce stretch and provides a starting point for further stretch minimization. Finally, a stretch-driven atlas generator that improves results over previous techniques in geometry remeshing and texture map creation has been shown.

The invention claimed is:

1. A computer readable media having computer readable instructions for creating a texture map comprising:
optimizing a boundary between a corresponding plurality of charts by graph cutting in which graph cutting further comprises partitioning a chart into a first region and a second region by spectral clustering, and in which the chart boundary is chosen so that adjacent triangles balance GDD between embeddings determined by the first region and the second region, and in which the chart boundary is chosen by using a GDD balance metric measuring embedding distortion having the form of $$c_{distort}(f_i, f_j) = \frac{d_{distort}(f_i, f_j)}{avg(d_{distort})};$$

and
rendering the result of the optimizing on a display device.

2. A computer readable media having computer readable instructions for creating a texture map comprising:
optimizing a boundary between a corresponding plurality of charts by graph cutting in which graph cutting comprises partitioning a chart into a first region and a second region by spectral clustering, and in which the chart boundary includes a smooth cut through a plurality of edges having a high dihedral angle, and in which the plurality of smooth edges is chosen utilizing:

$$c_{ang}(f_i, f_j) = \left(1 + \frac{d_{ang}(f_i, f_j)}{avg(d_{ang})}\right)^{-1};$$

and
rendering the result of the optimizing on a display device.

3. A computer readable media having computer readable instructions for creating a texture map comprising:
optimizing a boundary between a corresponding plurality of charts by graph cutting in which graph cutting comprises partitioning a chart into a first region and a second region by spectral clustering, and in which the chart boundary is chosen by a weighted sum of a first term having a first form of:

$$c_{ang}(f_i, f_j) = \left(1 + \frac{d_{ang}(f_i, f_j)}{avg(d_{ang})}\right)^{-1},$$

and
a second term having a second form of:

$$c_{distort}(f_i, f_j) = \frac{d_{distort}(f_i, f_j)}{avg(d_{distort})};$$

and
rendering the result of the optimizing on a display device.

4. A computer readable media having computer readable instructions for performing spectral analysis for chartification comprising:
ranking a plurality of eigenvalues $\lambda i$ and corresponding plurality of eigenvectors derived from a surface spectral analysis such that $(\lambda 1 \geq \lambda 2 \geq \ldots \geq \lambda N)$;
selecting a set of top n eigenvalues and a set of eigenvectors such that the quantity $\lambda n/\lambda+1$ is maximized;
computing, for each vertex i of a plurality of meshes, a set of n-dimensional embedding coordinates;
finding, for each of the n embedding coordinates, a first vertices with a maximum coordinate value and a second vertices with a minimum coordinate values, and setting the first vertice with a maximum coordinate value and the second vertice with a maximum coordinate value as a first plurality of 2n representatives;
removing each of the plurality of representatives which are too close together to yield a second set of m representatives, where $m \leq 2n$; and
growing charts simultaneously around the representatives using the geodesic distance calculated with surface spectral analysis to partition the mesh into m parts; and
rendering the result of the chartification on a display device.

5. A computer readable media having computer readable instructions for chartification comprising:
partitioning a surface into a plurality of charts based upon a prior knowledge of a color signal, and in which the plurality of pairwise signal distances between a plurality of vertices is a combination of geodesic and signal distances, and in which the combination of geodesic and signal distances is represented by:

$$d_{comb}(i, j) = \beta \frac{d_{geo}(i, j)}{avg(d_{geo})} + (1 - \beta) \frac{d_{sig}(i, j)}{avg(d_{sig})};$$

and
rendering the result of the chartification on a display device.

* * * * *